Aug. 21, 1951      L. M. BALL      2,565,163
CRABBING DEVICE
Filed Nov. 26, 1947
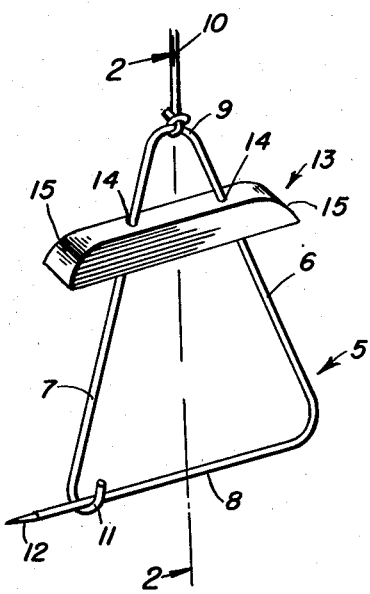
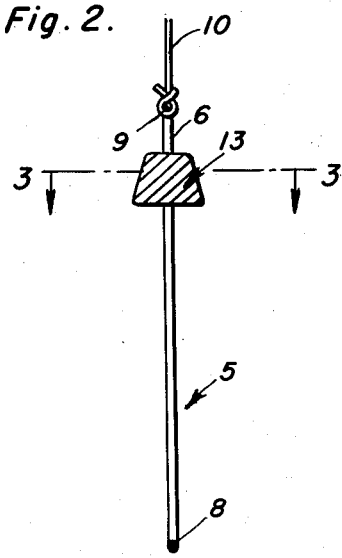
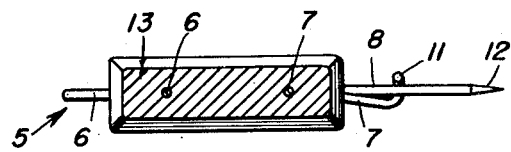
Leo M. Ball
*INVENTOR.*

Patented Aug. 21, 1951

2,565,163

UNITED STATES PATENT OFFICE 2,565,163

CRABBING DEVICE

Leo M. Ball, Houston, Tex.

Application November 26, 1947, Serial No. 788,118

1 Claim. (Cl. 43—43.1)

The present invention relates to an improved and simple device for use on a crabbing line for catching crabs, particularly in relatively shallow crabbing waters.

When one goes crabbing he usually employs a line of sufficient strength, fastens a hunk of meat, or other suitable bait on the end of the line which is dropped overboard, and also attaches a sinker to facilitate the act of sinking the line to a desired depth for effective crabbing. Attaching and detaching spoiled meat, such as is ordinarily used for bait, is obnoxious to some and is also often considered objectionable.

Keeping in mind the crude practice now employed when a crabber goes crabbing, I have found it expedient and practicable to offer, for use on a crabbing line, a simple and effective accessory which is useful and efficient.

Briefly, in carrying out the principles of the invention, I provide a substantially triangular oversized safety pin which is attachable to the end of the line and which is provided with a permanently attached weight constituting a sinker, the latter being arranged so that it does not interfere with putting the meat on or taking the meat off of the pointed end of the pin.

Other objects and advantages will become more readily apparent from the following description and the accompanying illustrative drawings.

In the drawings:

Figure 1 is a perspective view of a sinker-equipped crabbing pin constructed in accordance with the invention.

Figure 2 is a central sectional view on the line 2—2 of Figure 1.

Figure 3 is a view at right angles thereto and looking down in the direction of the arrows on the line 3—3 of Figure 2.

Referring now to the drawings by distinguishing reference numerals, the "safety pin" is denoted by the numeral 5 and, as stated, is of triangular form and includes a pair of divergent limbs 6 and 7 and a connective limb 8. The apex portion is slightly rounded as at 9 and provides a convenient portion for attachment or fastening of the crabbing line 10 thereto. The free end of the limb 7 is fashioned into a keeper hook 11 and the separably associable end of the limb 8 is pointed as at 12, the pointed end portion being releasably connectible with the keeper hook in a well known "safety pin" fashion.

In addition to providing a readily openable and closable and suitably shaped pin on the end of the line for fastening of the meat or equivalent bait to said line, I provide a sinker. The sinker is here denoted by the numeral 13 and has its end portions rigidly secured at the points 14 to said limbs 6 and 7. The terminal ends of the weight or sinker project beyond the limbs and are rounded or chamfered, as shown at 15. The sinker or weight is generally rectangular in configuration and cross-sectional form. It is so situated that it does not interfere with opening, closing and other operations of the pin in respect to fastening the bait (not shown) to same.

It is believed that the construction and use of the invention and features and advantages of same will be clear to the reader since almost every one is familiar with crabbing and handling of baited lines, etc.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details coming within the field of invention claimed may be resorted to in actual practice, if desired.

Having described the invention, what is claimed as new is:

A bait attaching and holding device for the end of a hand-type crabbing line comprising a relatively large substantially triangular safety pin of a size sufficient to pierce and suspend a hunk of meat such as is used in hand crabbing procedures, said safety pin including divergent resilient limbs, one limb terminating in a keeper hook, the other limb terminating in lateral bait penetrating pin, the terminal of said pin being pointed and releasably connected with said keeper hook, the apex portion of said safety pin being adapted to permit a crabbing line to be attached thereto, and a sinker, said sinker being a relatively heavy lead bar of rectangular cross-section, said diverging limbs piercing the end portions of said bar, said end portions projecting outwardly beyond said limbs, said bar being spaced downwardly from the apex portion and cooperating with the latter and the adjacent limb portions in defining a line attaching eye.

LEO M. BALL.

REFERENCES CITED

The following references are of record in the file of this patent:

UNITED STATES PATENTS

| Number | Name | Date |
|---|---|---|
| 788,197 | Fairbanks et al. | Apr. 25, 1905 |
| 843,651 | Willing | Feb. 12, 1907 |
| 863,272 | Gebhardt | Aug. 13, 1907 |
| 1,251,810 | Oehler | Jan. 1, 1918 |
| 2,303,753 | Merle | Dec. 1, 1942 |
| 2,462,290 | Sauvey | Feb. 22, 1949 |